United States Patent Office 3,368,010
Patented Feb. 6, 1968

3,368,010
PROCESS FOR MAKING HYDRATION RESISTANT
REFRACTORY BRICK
John L. Cummings, Sr., Clearwater, Fla.
No Drawing. Continuation-in-part of application Ser. No. 262,333, Mar. 4, 1963. This application Dec. 27, 1965, Ser. No. 516,676
6 Claims. (Cl. 264—63)

ABSTRACT OF THE DISCLOSURE

A process for making a hydration resistant refractory brick or ramming material from easily hydratable refractory aggregates. The refractory aggregates are first coated with core oil as a moisture inhibitor to reduce the hydration properties of the aggregates. The coated aggregates are then mixed with powdered pitch and the core oil coating serves as an adhesive or carrier so that the powdered pitch adheres to the coated refractory aggregates and forms a second moisture inhibitor coating on the aggregates. The core oil coating also serves to evenly distribute the powdered pitch on the aggregates. The aggregates, with the core oil coating and powdered pitch coating, are compacted and molded into brick shapes and heated to a temperature above the melting point of the powdered pitch. The liquified pitch encapsulates the aggregates and forms a relatively impervious seal against hydration.

---

This invention relates to a process of preparing lining material for oxygen vessels in which steel is made by blowing oxygen onto the surface of the bath, and the present application is a continuation-in-part of an application serially numbered 262,333 filed Mar. 4, 1963. In my former application, I have disclosed a method of making lining material for vessels having capacities of from 30 to 300 tons and produce from 18 to 22 or more heats a day at the rate of approximately 55 minutes per heat. This method is becoming of increasing importance and the top blown oxygen converter appears to be replacing the open hearth steel making furnace.

The oxygen converter for basic steel making and other steel melting or transferring vessels are lined with refractory aggregates such as dolomite, magnesite, or high alumina or other clays which may be of brick form covered with a rammed layer of tar and magnesite or the lining may be bricks made of tar and dolomite, tar and magnesite, or tar and alumina clay or other refractory materials. These linings must be frequently replaced and refractory consumption has been reported as between 20 and 30 pounds per ton of steel ingots.

Because dead burnt dolomite has a tendency to hydrate, it cannot be molded to shape and used in brick form unless the granular dolomite particles are sealed against atmospheric moisture. The present practice is to mix dolomite and magnesite or periclase properly proportioned and sized with hot molten pitch or tar of low melting temperature, and the mixture is molded into suitable shapes and sizes while the pitch is molten. It has been found that the dolomite in such pitch coated mixture is not stable and hydrates and the molded product, when stored, does not retain its shape and size for long. Also, the hot pitch causes the heated mixture to stick to the molds and pressure platens and the finished brick does not have sharp corners.

It is a primary object of this invention to provide a method of applying pitch in granular or powdered form of high carbon content, and which is of higher melting temperatures than the hot pitch heretofore employed, to the dead burnt dolomite and magnesite particles and mold the mixture to shape before fusing or melting the pitch by heat.

It is a further object of this invention to provide a method of applying protective coatings to dolomite particles by utilizing a wet or liquid coating material as a carrier to apply a second dry coating material and utilize the mixture of wet and dry coating materials to mix with still another dry coating material during the preparation of the mixture as a molding composition.

It is still a further object of the invention to provide a method of preparing a lining material of the above-designated character in which the dolomite or other refractory particles are, in the main, of a coarse grain to aid in the efficient coating thereof by the wet coating material and to utilize the pitch and periclase in a powderous form so when mixed with the wet coating material, the latter acts as a carrier for distributing the fine powdered pitch and periclase particles uniformly over the surfaces of the dolomite particles.

In carrying out the above objects of the invention, I utilize core oil such as is commonly used as a bond for making cores in foundries and in making abrasive grinding wheels, the particles being thoroughly coated with the core oil and molded to shape. In foundry practice, the core oil acts as an inhibitor of moisture because if a core contained moisture when placed in the cask, it would blow up or disintegrate when the hot metal is poured. In the instant case, in addition to the core oil acting as a protective moisture-proof coating for the dolomite against atmospheric moisture, it is used in sufficient amounts to act as a carrier fluid for a high melting temperature dry pitch of high coke value. After the dolomite grains have been completely coated with the protective layer of core oil, the dry powdered high temperature pitch is added to thoroughly coat the dolomite grains for a second protective coating. A third protective coating may be added in the form of hydration resistant ball milled dead burnt magnesia before molding the composition.

The core oil used in foundry core molding may be linseed oil and rosin or a synthetic resin. The resin in the core oil develop a strong bond between the refractory grains and the dry high melting temperature pitch for easy removal from the forming press and handling to the dryer or oven for heating to the fusing temperature of the pitch. The heat causes the pitch to fuse and become liquid and uniformly coat and seal the dolomite or other refractory particles against moisture in addition to the protection of the dried resin or core oil.

When coated with core oil, pitch and ball milled periclase, the dolomite is triple sealed against moisture and is highly resistant to hydration and will hold its shape in storage for a considerable time.

I have found that my three-step process of sealing may be employed on dolomite or periclase or a mixture of two when calcined and used in various screen sizes and proportions, and it may be so employed in mixtures for molding shapes or ramming material for oxygen vessel lining refractories, in which case the furnace operating temperature provides the heat to fuse the pitch.

For example, the following proportions of dolomite and periclase are suited for making lining brick by mixing with core oil and powdered pitch:

60% dolomite:
    42% (6 mesh)
    18% (3 mesh)
40% periclase:
    15% (−10 +35 mesh)
    12½% (−35 mesh)
    12½% (ball mill 8 microns)

The proportions may be varied by adding more periclase at increased cost if greater refractoriness is desired and the screen sizing may be varied to improve molding and density characteristics.

Another example of the dolomite and periclase ratio with proportions of core oil and powdered dry high temperature pitch is as follows:

| | |
|---|---|
| 6 mesh dead burnt dolomite | percent 56 |
| 3 mesh dead burnt dolomite | do 24 |
| 35 mesh dead burnt periclase or magnesite | percent 10 |
| Ball milled 8 microns periclase | do 10 |
| Core oil | percent by weight 3 |
| Finely ground dry high melting pitch | do 6 |

The dolomite is mixed with core oil to completely coat all grains; finely ground dry pitch powder is added to the mixture to coat all of the dolomite, the pitch powder being held by the core oil; the ball milled periclase or magnesite may be added and thoroughly mixed, or omitted because it is more costly than dolomite. The mixture is then molded to shape in press molds and ejected from the press.

The formed brick may be slid down a plate lubricated with core oil and additional core oil may be sprayed on the top, sides and ends of the brick if desired. The spraying would insure additional protection and sealing against hydration during the period when the molded brick are stacked on cars and placed in an oven heated between 400 to 500° F. The pitch dust melts at approximately 265° F. to 350° F. and will run sufficiently to coat and seal all the dolomite and periclase particles if used in the molded product. The heating may be prolonged from 4 to 18 hours depending on the temperature and available time for packing and shipping.

The use of the core oil not only inhibits moisture in the dolomite particles, but acts as a carrier to provide good distribution of the powdered pitch to seal off the dolomite. The core oil and dry pitch acts as a bond to render the composition a moldable mixture and the carbon in the pitch improves refractoriness of the lining material by providing a non-wetting surface for the iron, and a coke bond at elevated temperatures.

Although several proportions of ingredients and mixtures of sealers and binders have been described by way of example to demonstrate the invention, it is evident that the use of a viscous substance such as core oil as a carrier for the dry powdered pitch to obtain thorough and complete coating of a hydratable material to seal it against the atmosphere is the gist of the invention and the precise proportion of the refractory materials, carrier and binder may be greatly varied within the scope thereof. The dry pitch can be of higher melting temperature and has better or higher coking qualities than the low melting pitch employed in the hot pitch process in conventional use. Although the process as stated has been with the use of dolomite grain, it is not the intent to limit the process to dolomite grain, but it can be used equally effective with dead burnt magnesite, bauxite or any refractory grain. It is further evident that the method invention has many uses. It may be employed to produce refractory ramming mixes and for distributing dry binding material by liquid carriers in compositions of aggregates and fines for molding or other purposes.

I claim:
1. The method of making hydration resistant refractory material from fine and coarse grain hydratable refractory aggregates comprising the steps of,

(a) mixing said hydratable refractory aggregates which are in the main of a coarse grain with a liquid coating material to thoroughly wet the surface thereof,
(b) mixing said hydratable refractory aggregates which are of a fine grain size with a powdered moisture inhibitor,
(c) thereafter admixing the dry mixture of fine grained refractory aggregate and powdered moisture inhibitor with the liquid coated aggregates to uniformly coat the surface of said liquid coated aggregates with said dry mixture, and
(d) molding said mixture.

2. The method of making hydration resistant refractory material from hydratable refractory aggregates as set forth in claim 1 in which
(a) said hydratable refractory aggregates are selected from the group consisting of dolomite, magnesite and mixtures of dolomite and magnesite, and
(b) said liquid moisture inhibitor comprises core oil.

3. The method of making hydration resistant refractory material from hydratable refractory aggregates as set forth in claim 1 which includes
admixing a second refractory aggregate having a size substantially smaller than said coarse grain hydratable refractory aggregate with said hydratable refractory aggregate coated with said liquid moisture inhibitor and said powdered moisture inhibitor to form a third coating on said hydratable refractory aggregate.

4. The method of making hydration resistant refractory material from hydratable refractory aggregates as set forth in claim 1 which includes after molding, heating the molded mixture of said coated refractory aggregates to an elevated temperature.

5. The method of making hydration resistant refractory material from hydratable refractory aggregates as set forth in claim 2 in which
said powdered moisture inhibitor comprises fine powdered pitch.

6. The method of making hydration resistant refractory material from hydratable refractory aggregates as set forth in claim 5 in which
said fine grain hydratable refractory aggregates comprise about 10 to 12½ percent of said hydratable refractory aggregate,
said core oil is employed in the amount of about 3 percent by weight of said hydratable refractory aggregate, and
said fine powdered pitch is employed in the amount of about 6 percent by weight of said hydratable refractory aggregate.

References Cited

UNITED STATES PATENTS

| | | |
|---|---|---|
| 3,015,850 | 1/1962 | Rusoff et al. |
| 3,070,449 | 12/1962 | Davies et al. |
| 2,699,997 | 1/1955 | Hardman et al. 106—38.7 |

FOREIGN PATENTS

| | | |
|---|---|---|
| 1,318,069 | 1/1963 | France. |
| 690,859 | 4/1953 | Great Britain. |

ROBERT F. WHITE, *Primary Examiner.*

J. A. FINLAYSON, J. R. HALL, *Assistant Examiners.*